United States Patent
Chen et al.

(10) Patent No.: US 10,152,553 B2
(45) Date of Patent: Dec. 11, 2018

(54) METHOD AND SYSTEM FOR INTEGRATING MULTIPLE CONTENTS IN DYNAMIC WEBPAGE

(71) Applicant: TENCENT TECHNOLOGY (SHENZHEN) COMPANY LIMITED, Shenzhen (CN)

(72) Inventors: Zihao Chen, Shenzhen (CN); Huantong Liu, Shenzhen (CN); Qiang Tu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 219 days.

(21) Appl. No.: 14/746,726

(22) Filed: Jun. 22, 2015

(65) Prior Publication Data
US 2015/0286745 A1    Oct. 8, 2015

Related U.S. Application Data
(63) Continuation of application No. PCT/CN2013/084349, filed on Sep. 26, 2013.

(30) Foreign Application Priority Data
Dec. 24, 2012    (CN) .......................... 2012 1 0566940

(51) Int. Cl.
*G06F 17/30*    (2006.01)
*G06Q 50/00*    (2012.01)
(Continued)

(52) U.S. Cl.
CPC .. *G06F 17/30905* (2013.01); *G06F 17/30896* (2013.01); *G06Q 50/01* (2013.01);
(Continued)

(58) Field of Classification Search
CPC ...................................................... G06F 17/30
See application file for complete search history.

(56) References Cited

U.S. PATENT DOCUMENTS
9,268,818 B1 *    2/2016    Pattan ............... G06F 17/30525
9,569,801 B1 *    2/2017    Xu ........................ G06Q 50/01
(Continued)

FOREIGN PATENT DOCUMENTS
| | | | |
|---|---|---|---|
| CN | 101415007 A | 4/2009 | |
| CN | 101854399 A * | 10/2010 | ............. H04L 29/08 |

(Continued)

OTHER PUBLICATIONS
State Intellectual Property Office of the P.R.C (SIPO) Office Action 1 for 201210566940.8 dated Mar. 20, 2017 10 Pages.
(Continued)

*Primary Examiner* — Scott T Baderman
*Assistant Examiner* — Sookil J Lee
(74) *Attorney, Agent, or Firm* — Anova Law Group, PLLC

(57) ABSTRACT

A method for dynamically presenting webpage information and the related systems are disclosed. The method includes: receiving an instruction to invoke a dynamic webpage including first account information; sending an information acquisition instruction to each designated online social platform according to second account information, which corresponds to the first account information, of each designated online social platform; receiving data returned by each designated online social platform and performing format conversion on the data, so as to convert the data into data in a designated data format; and integrating the data in a converted format and of each designated online social platform into a complete data list and displaying the integrated data list. According to the solutions of the present
(Continued)

disclosure, when webpage information of multiple online social platforms needs to be viewed, it is unnecessary to separately log in to multiple account numbers for viewing. After data is pulled from each online social platform, the data may be converted into data in a uniform format. The data may then be integrated and viewed. System consistent with the present disclosure enables data sharing between different types of online social network products.

18 Claims, 10 Drawing Sheets

(51) Int. Cl.
    *H04L 29/08* (2006.01)
    *H04W 4/021* (2018.01)
    *H04W 4/06* (2009.01)
    *H04W 4/21* (2018.01)

(52) U.S. Cl.
    CPC .............. *H04L 67/02* (2013.01); *H04L 67/10* (2013.01); *H04L 67/2823* (2013.01); *H04W 4/021* (2013.01); *H04W 4/06* (2013.01); *H04W 4/21* (2018.02); *H04L 67/306* (2013.01)

(56) References Cited

U.S. PATENT DOCUMENTS

| | | | |
|---|---|---|---|
| 2004/0225669 A1 | 11/2004 | Isaacson et al. | |
| 2010/0100952 A1* | 4/2010 | Sample | H04L 51/066 726/9 |
| 2011/0269507 A1* | 11/2011 | Polis | H04L 67/2833 455/566 |
| 2012/0072416 A1* | 3/2012 | Gowel | G09B 7/00 707/723 |
| 2012/0110429 A1* | 5/2012 | Tzonis | G06Q 10/10 715/230 |
| 2012/0117239 A1* | 5/2012 | Holloway | H04L 61/1511 709/226 |
| 2012/0212782 A1* | 8/2012 | Matsuda | G06K 15/1857 358/1.15 |
| 2012/0226988 A1 | 9/2012 | Sharma | |
| 2013/0097124 A1* | 4/2013 | de Souza | G06Q 10/10 707/692 |
| 2013/0132861 A1* | 5/2013 | Kienzle | G06Q 10/10 715/753 |
| 2013/0198275 A1* | 8/2013 | Forsblom | G06Q 50/01 709/204 |
| 2014/0006538 A1* | 1/2014 | Oikonomou | H04L 67/2847 709/213 |
| 2014/0082070 A1* | 3/2014 | Chakraborty | G06Q 50/01 709/204 |
| 2014/0089349 A1* | 3/2014 | Mercier | G06F 17/30719 707/796 |
| 2014/0331124 A1* | 11/2014 | Downs | G06F 17/212 715/243 |

FOREIGN PATENT DOCUMENTS

| | | |
|---|---|---|
| CN | 101854399 A | 10/2010 |
| CN | 101901252 A | 12/2010 |
| CN | 102710636 A | 10/2012 |

OTHER PUBLICATIONS

Pip.io first experience, Appin.com, Nov. 4, 2010, http://www/appinn.com/pip-io.
The World Intellectual Property Organization (WIPO) International Search Report for PCT/CN2013/084349 dated Jan. 2, 2014.
The State Intellectual Property Office of the People's Republic of China (SIPO) Office Action 1 for 201210566940.8 dated Nov. 1, 2017 8 Pages (including translation).
Wang Yahong: Blur, the MOTO social platform, possesses the ability to synchronize contacts and social accounts, Sep. 11, 2009. http://digi.it.sohu.com/20090911/n266656945.shtml 9 Pages (including translation).

* cited by examiner

METHOD AND SYSTEM FOR INTEGRATING MULTIPLE CONTENTS IN DYNAMIC WEBPAGE

RELATED APPLICATION

This application is a continuation application of PCT/CN2013/084,349, filed on Sep. 26, 2013, and claims priority to Chinese Patent Application No. 201210566940.8, entitled "WEBPAGE INFORMATION PRESENTATION METHOD AND WEBPAGE INFORMATION PRESENTATION SYSTEM," filed on Dec. 24, 2012. The entire content of the priority applications is incorporated by reference into the present disclosure.

FIELD OF THE TECHNOLOGY

The present disclosure relates to the field of Internet communications technologies, and in particular, to a method for dynamically presenting webpage information and the related applications and systems.

BACKGROUND OF THE DISCLOSURE

With the advancement of Internet technologies and the development of online social platforms, various online social network products emerge to meet different social networking demands. The online social network products gradually show diverse characteristics. Moreover, different online social platforms position themselves differently. For example, a QQzone by Tencent is mainly used for sharing personal data, insights, and the like in a friend circle. Weibo (microblog) is used similar to broadcasting a message in a public square. Because positioning of online social platforms and their target audiences are different, a user generally uses multiple different social platforms and selects different social network products to share and retrieve information.

In a current application of an online social network product, generally, the application presents user-related information after the user logs in, and content of another online social network product is not involved. Because the user uses various online social network products, when needing to view information of a friend, the user may need to log in to different online social network products to follow and view the information and sharing of information of different online social network products cannot be implemented easily.

SUMMARY

To address the above the related problems in prior systems, an objective of the present disclosure is to provide a method for dynamically presenting webpage information and a webpage information presentation system, which enables sharing of data from different types of online social network products.

One aspect of the present disclosure provides a method for dynamically presenting webpage information, comprising: receiving an instruction to invoke a dynamic webpage, the webpage invoke instruction comprising first account information; sending an information acquisition instruction to a designated online social platform according to second account information, the second account information of the designated online social platform corresponding to the first account information, the information acquisition instruction including the second account information; receiving data returned by the designated online social platform; converting a format of the received data into data in a designated data format; integrating the data in the converted format into a complete data list; and displaying the integrated data list.

Another aspect of the present disclosure provides a webpage information presentation system, comprising: a data pulling unit, configured to receive an instruction to invoke a dynamic webpage, the webpage invoke instruction including first account information; to send an information acquisition instruction to each designated online social platform according to second account information, the second account information of each designated online social platform corresponding to the first account information, the information acquisition instruction including the second account information; and to receive data returned by each designated online social platform; a format conversion unit, configured to convert the data received from each designated online social platform into a designated data format; an integration unit, configured to integrate the converted data of each designated online social platform into a complete data list; and a display unit, configured to display the integrated data list.

Another aspect of the present disclosure provides a computer readable storage medium storing a computer executable instruction, when executed by a processor, the computer executable instruction performing a method for dynamically presenting webpage information, the webpage information presentation method comprising: receiving an instruction to invoke a dynamic webpage, the webpage invoke instruction comprising first account information; sending an information acquisition instruction to each designated online social platform according to second account information, the second account information of each designated online social platform corresponding to the first account information, the information acquisition instruction including the second account information; receiving data returned by each designated online social platform and converting the data into a designated data format; and integrating the converted data of each designated online social platform into a complete data list and displaying the integrated data list.

DESCRIPTION OF EMBODIMENTS

The following describes the solutions of the present disclosure in detail with reference to preferred embodiments. In the following description, embodiments of webpage information presentation methods of the present disclosure are first described, and then, embodiments of webpage information presentation systems of the present disclosure are described.

Figure 9:
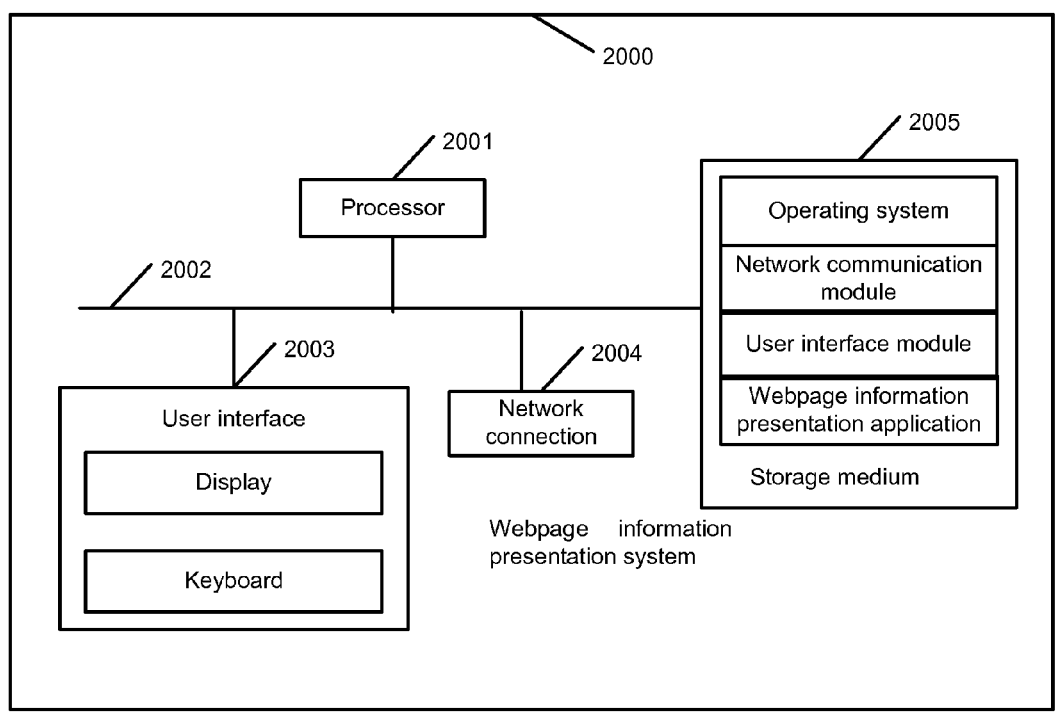
FIG. 9 is another block diagram of an exemplary webpage information presentation system consistent with the present disclosure.
Figure 10:
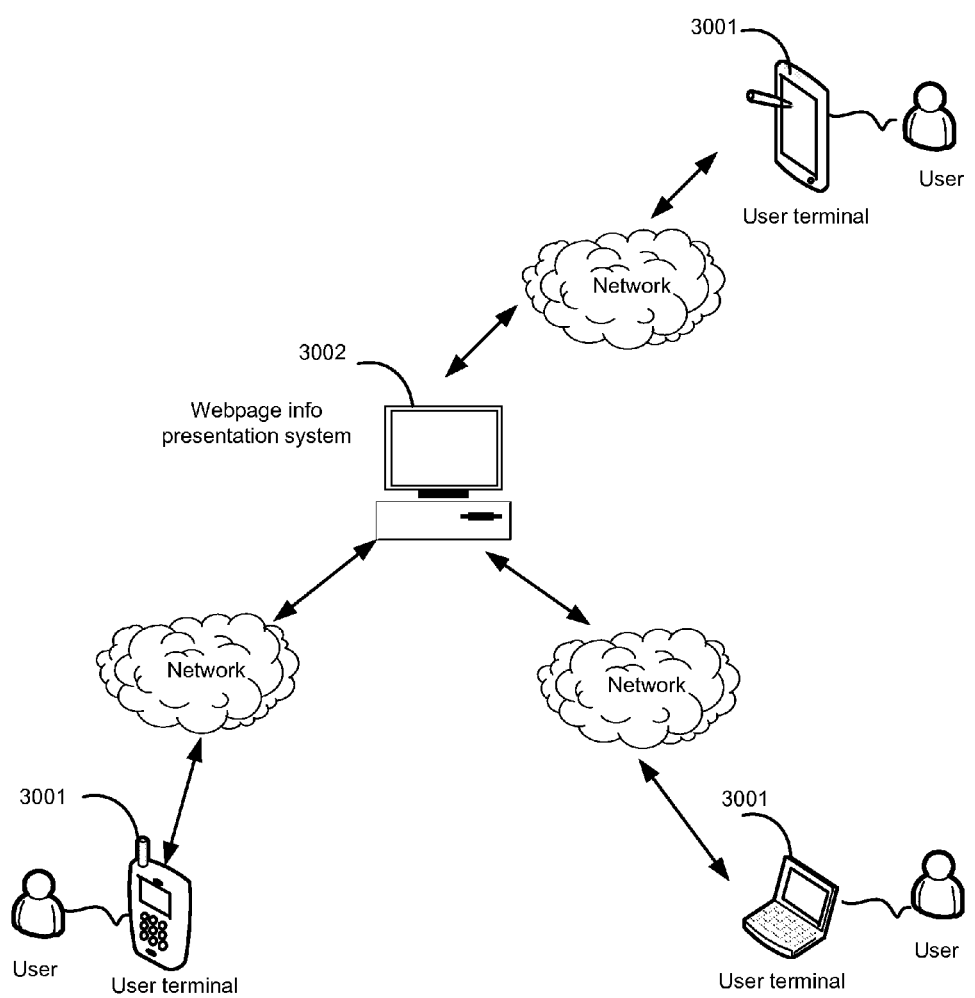
FIG. 10 is an exemplary system for conducting online transactions consistent with the present disclosure.

FIG. 10 is an exemplary system diagram of a webpage information presentation system and multiple user terminals consistent with the present disclosure. As shown in FIG. 10, the system for presenting webpage information may include user terminals 3001, an online webpage information presentation system 3002. The user terminals 3001 are connected to the webpage information presentation system 3002. The user terminals 3001 may be any of the user terminals described in relation to FIGS. 1-9 below. The webpage information presentation system 3002 may the any of the webpage information presentation systems described in relation to the Figures below.

As shown in FIG. 10, the user terminal 3001 may scan product label information. The label information includes product information. The label information may be an identification of the product using a graphic code or an NFC tag. Further, the user terminal 3001 may generate purchase order information. The purchase order information includes product information and a selected payment method for the product. The user terminal 3001 may send the purchase order information to the webpage information presentation system 3002. The webpage information presentation system 3002 may complete the online purchase according to the payment method specified in the purchase order information.

In some embodiments, the user terminal 3001 may log in a first social network application, and send an instruction to invoke a webpage, where the instruction to invoke a webpage includes first account information.

In some embodiments, the user terminal 3001 may send an information acquisition instruction to each set online social platform according to second account information of each set online social platform to webpage information presentation system 3002. The second account information corresponds to the first account information. The webpage information presentation system 3002 may retrieve data from each set online social platform and convert the data into a set data format. The webpage information presentation system 3002 may de-duplicate the data in a converted format and of each set online social platform. The webpage information presentation system 3002 may extract data meeting a set selection condition from the data in a converted format. The webpage information presentation system 3002 may integrate the data, obtained after the deduplication processing, of each set online social platform into a complete data list. The webpage information presentation system 3002 may display the integrated data list on user terminal 3001.

Embodiment 1

Figure 1:
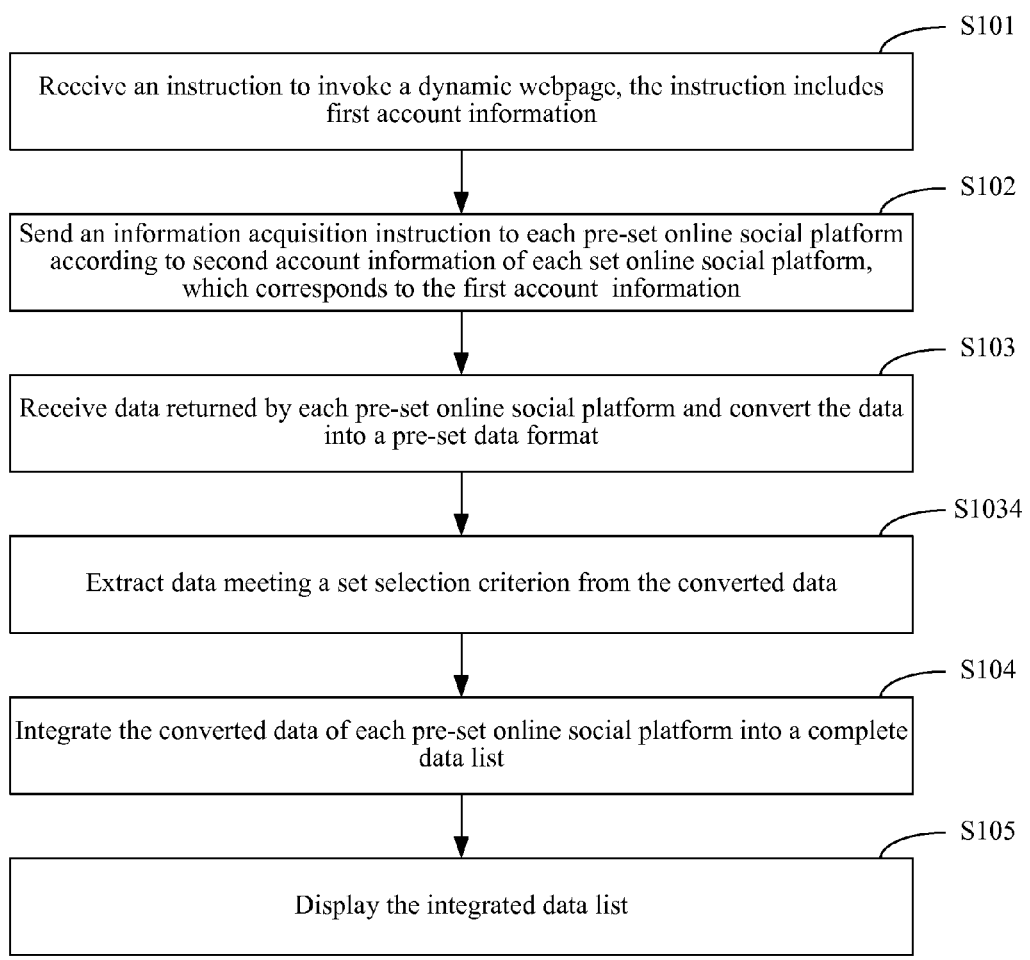
FIG. 1 is a schematic flowchart of Embodiment 1 of a method for dynamically presenting webpage information according to the present disclosure.

FIG. 1 is a schematic flowchart of Embodiment 1 of a method for dynamically presenting webpage information according to the present disclosure.

As shown in FIG. 1, the webpage information presentation method in Embodiment 1 includes:

Step S101: Receive an instruction to invoke a dynamic webpage, where the webpage invoke instruction includes account information, and for the convenience of differentiating the account information from account information of a subsequent designated online social platform, the account information is referred to as first account information.

Step S102: Send an information acquisition instruction to each designated online social platform according to account information, which corresponds to the first account information, of each designated online social platform, where, for the convenience of differentiating the account information from the foregoing first account information, the account information is referred to as second account information, and the information acquisition instruction includes the foregoing second account information.

Step S103: Receive data returned by each designated online social platform and perform format conversion on the data, so as to convert the data into data in a designated data format.

Step S104: Integrate the data in a converted format and of each designated online social platform into a complete data list.

Step S105: Display the integrated data list.

According to the solution of this embodiment, when a webpage needs to be opened, after an instruction to invoke a dynamic webpage is received, an information acquisition instruction is also sent to each corresponding designated online social platform, so as to pull data from each designated online social platform according to the webpage invoke instruction, and format conversion is performed on the data received from each designated online social platform and the data of each designated online social platform is converted into data in a uniform format, and then, the data is integrated into a uniform data list for display. Therefore, when webpage information of multiple online social platforms needs to be viewed, it is unnecessary to separately log in to multiple account numbers for viewing. After data is pulled from each online social platform, the data may be converted into data in a uniform format, and then, the data is integrated and viewed, which is convenient and fast, and enables data sharing among different types of online social network products.

The second account information, which corresponds to the first account information, of each designated online social platform may be the same as the foregoing first account information, or may be different from the foregoing first account information.

During viewing of data of each online social network product, in a general situation, it may be that only some information in which a user is interested is viewed, and there is no need to view all data of an online social network product. Therefore, only data meeting a condition may be integrated, and then displayed. According to this, between step S103 and step S104, the method may further include:

Step S1034: Extract data meeting a pre-determined selection criterion from the data in a converted format.

In this case, the data for integration in step S104 is data selected in step S1034.

The set selection condition may be set differently according to different actual application needs and different considerations.

In one embodiment, it may be that only a first preset number of pieces of latest data are provided, so as to view latest webpage information, that is, data meeting a pre-determined selection criterion includes the first preset number of pieces of latest data, where the first preset number may be set according to an actual need, for example, may be set to five, ten, twenty, or the like.

In another manner, it may be that data within a recent time period is provided, so as to view webpage information in a recent time period, that is, data meeting a pre-determined selection criterion includes data in a preset time period, where the preset time period may be set according to an actual need, for example, may be set to ten days, half a month, one month, three months, six months, or the like, and setting may be different according to different needs.

In another manner, considering that the online social platform may provide multiple different types of webpage information, but a user may only need to follow one type of webpage information, for example, webpage information of a zone web feed of a Tencent product may include various different types of information such as status, and a picture, it may be that data of one set information type is provided, that is, data meeting a pre-determined selection criterion includes data of a set information type, where the information type may be set differently according to differences in specific online social platforms and differences in specific actual needs.

In the foregoing descriptions, descriptions are made by using an example in which the set selection conditions respectively are a first preset number of pieces of latest data, data within a recent time period, and data of a set information type. According to an actual need, another selection condition may also be set, or these selection conditions may be combined in any combination manner for selection, such as, a first preset number of pieces of data of a set information type within a recent time period, and examples are not enumerated herein again.

Embodiment 2

Figure 2:
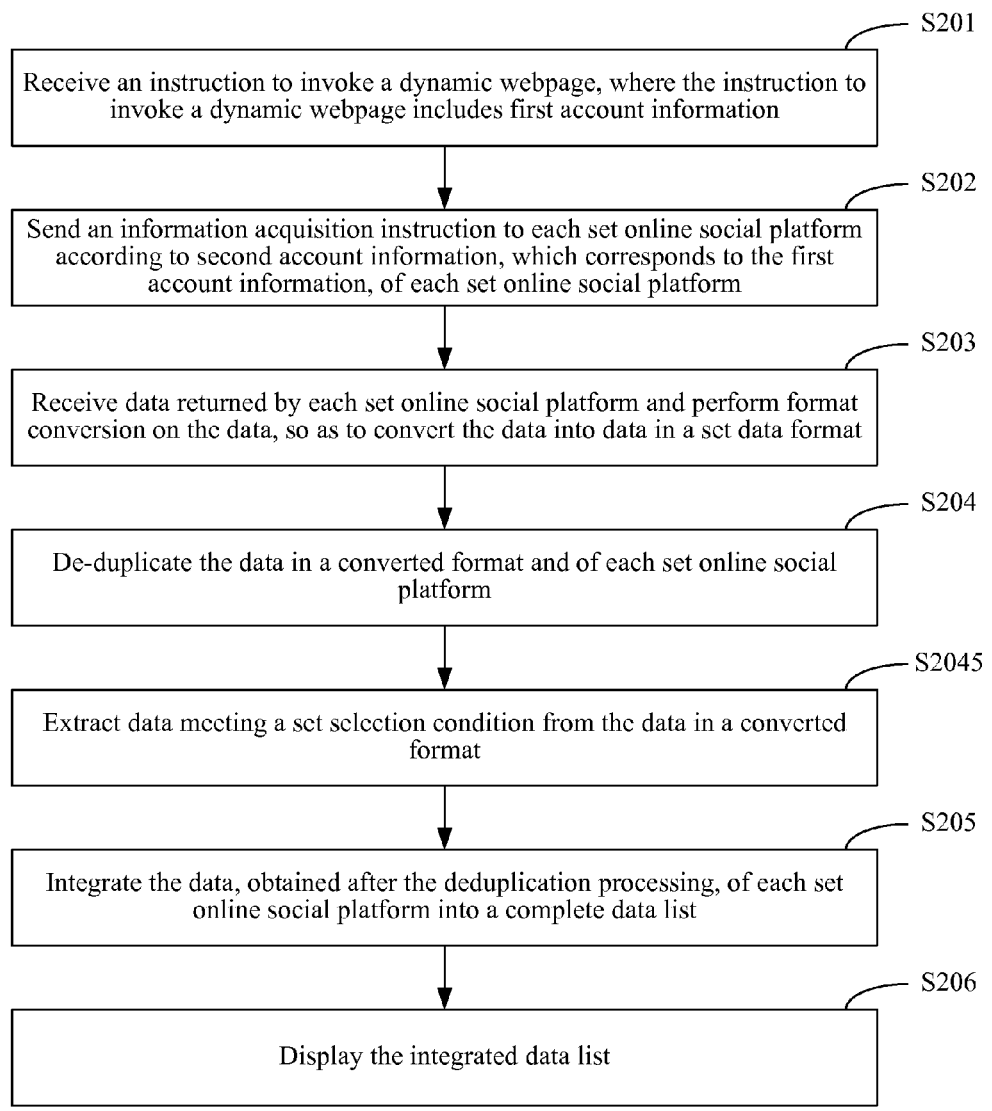
FIG. 2 is a schematic flowchart of Embodiment 2 of a method for dynamically presenting webpage information according to the present disclosure.

FIG. 2 is a schematic flowchart of Embodiment 2 of a method for dynamically presenting webpage information according to the present disclosure. A difference between this embodiment and the foregoing Embodiment 1 mainly lies in that the method in this embodiment further includes deduplication processing.

As shown in FIG. 2, the webpage information presentation method in Embodiment 2 includes:

Step S201: Receive an instruction to invoke a dynamic webpage, where the webpage invoke instruction includes first account information.

Step S202: Send an information acquisition instruction to each designated online social platform according to second account information, which corresponds to the first account information, of each designated online social platform, where the information acquisition instruction includes the foregoing second account information.

Step S203: Receive data returned by each designated online social platform and perform format conversion on the data, so as to convert the data into data in a designated data format.

Step S204: Perform deduplication processing on the data in a converted format and of each designated online social platform.

Step S205: Integrate the data, obtained after the deduplication processing, of each designated online social platform into a complete data list.

Step S206: Display the integrated data list.

In the solution of this embodiment, considering that one or some pieces of webpage information in an online social platform may be synchronized to another online social platform, in this embodiment, deduplication processing is performed to avoid duplicated presentation of same webpage information.

During viewing of data of each online social network product, in a general situation, it may be that only some information in which a user is interested is viewed, and there is no need to view all data of an online social network product. Therefore, only data meeting a condition may be integrated, and then displayed. According to this, between step S204 and step S205, the method may further include:

Step S2045: Extract data meeting a pre-determined selection criterion from the data in a converted format.

In this case, the data for integration in step S205 is data selected in step S2045.

The set selection condition may be set differently according to different actual application needs and different considerations. A specific selection manner may be the same as that of the foregoing Embodiment 1, and no further details are provided herein again.

Embodiment 3

Figure 3:
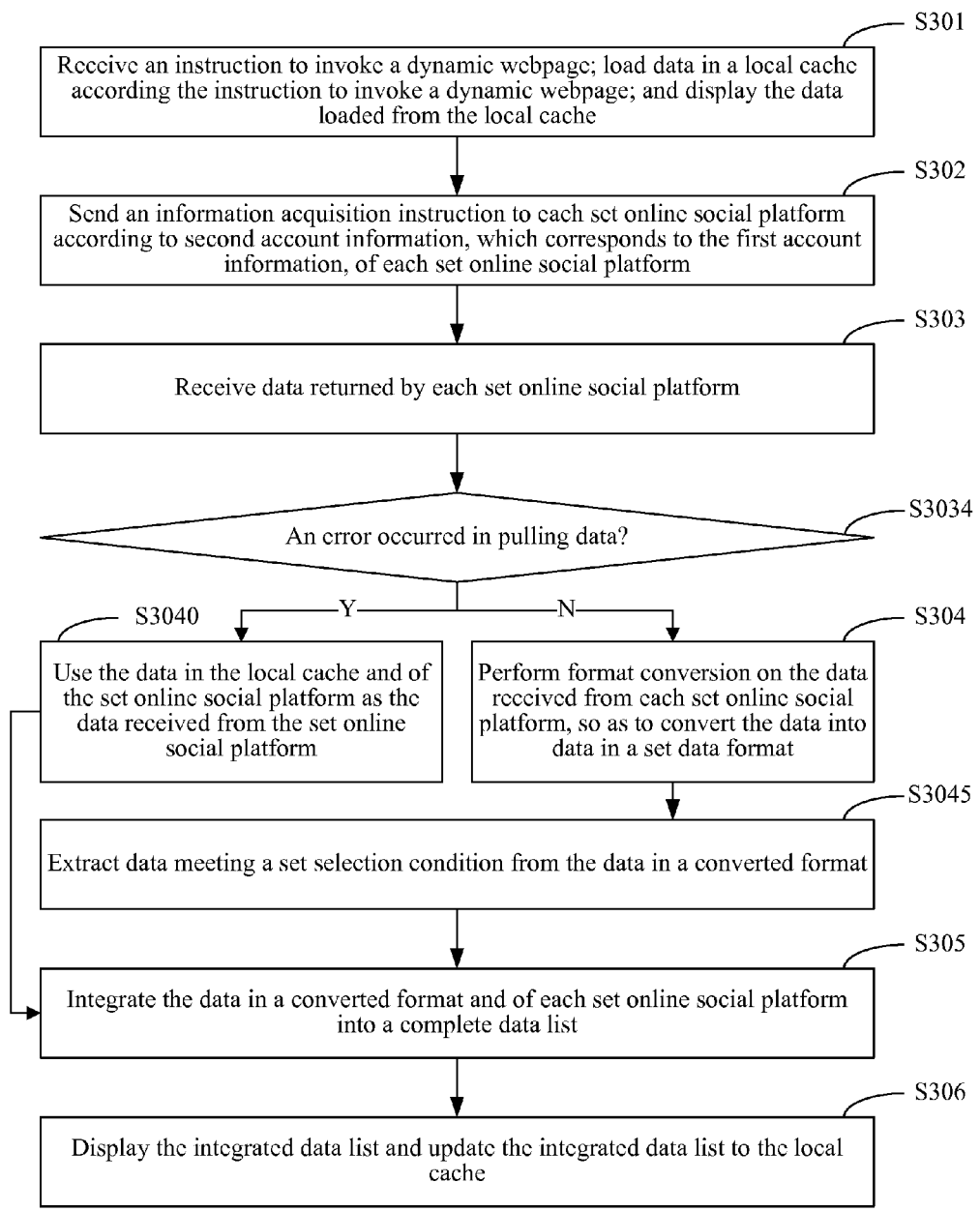
FIG. 3 is a schematic flowchart of Embodiment 3 of a method for dynamically presenting webpage information according to the present disclosure.

FIG. 3 is a schematic flowchart of Embodiment 3 of a method for dynamically presenting webpage information according to the present disclosure. A difference between this embodiment and the foregoing Embodiment 1 mainly lies in that the method in this embodiment further includes: updating integrated data to a local cache, and loading and displaying, on such a basis, the data in the local cache when an instruction to invoke a dynamic webpage is received.

As shown in FIG. 3, the webpage information presentation method in Embodiment 3 includes:

Step S301: Receive an instruction to invoke a dynamic webpage, where the webpage invoke instruction includes first account information; load data in the local cache according to the webpage invoke instruction; and display the data loaded from the local cache.

Step S302: Send an information acquisition instruction to each designated online social platform according to second account information, which corresponds to the first account information, of each designated online social platform, where the information acquisition instruction includes the foregoing second account information.

Step S303: Receive data returned by each designated online social platform.

Step S304: Perform format conversion on the data received from each designated online social platform, so as to convert the data into data in a designated data format.

Step S305: Integrate the data in a converted format and of each designated online social platform into a complete data list.

Step S306: Display the integrated data list and update the integrated data list to the local cache.

According to the solution of this embodiment, after the integrated data list is obtained, the integrated data list is further updated to the local cache, so that it is convenient to display the data list next time when webpage information is viewed. Moreover, during viewing of webpage information, data in the local cache is first loaded for display. This reduces pulling waiting process when data is pulled from an online social platform.

In the schematic flowchart shown in FIG. 3, a description is made by using an example in which after the webpage invoke instruction is received, the data in the local cache is first loaded for display, and then the data is pulled from each designated online social platform. Actually, a process in which data in a local cache is loaded for display and a process in which data is pulled from each designated online social platform may not be limited to a sequence shown in FIG. 3, and no sequence may be set for the two processes, or the two processes may be performed simultaneously, and no further details are provided herein again.

In the solution of this embodiment, after the data is pulled from each designated online social platform, processing on abnormal pulling may further be performed.

As shown in FIG. 3, between step S303 and step S304, the method in this embodiment may further include:

Step S3034: Determine whether an error occurs in receiving data from the designated online social platform, and if no error occurs, directly perform a processing process in step S304, or if an error occurs, perform step S3040.

Step S3040: Use the data in the local cache and of the designated online social platform as the data received from the designated online social platform. Because the data in the local cache actually is data obtained after format conversion and deduplication processing, after step S3040, an integration processing process in step S305 may be directly performed.

During viewing of data of each online social network product, in a general situation, it may be that only some information in which a user is interested is viewed, and there is no need to view all data of an online social network product. Therefore, only data meeting a condition may be integrated, and then displayed. According to this, between step S304 and step S305, the method may further include:

Step S3045: Extract data meeting a pre-determined selection criterion from the data in a converted format.

In this case, the data for integration in step S305 is data selected in step S3045.

The set selection condition may be set differently according to different actual application needs and different considerations. A specific selection manner may be the same as that of the foregoing Embodiment 1, and no further details are provided herein again.

Embodiment 4

Figure 4:
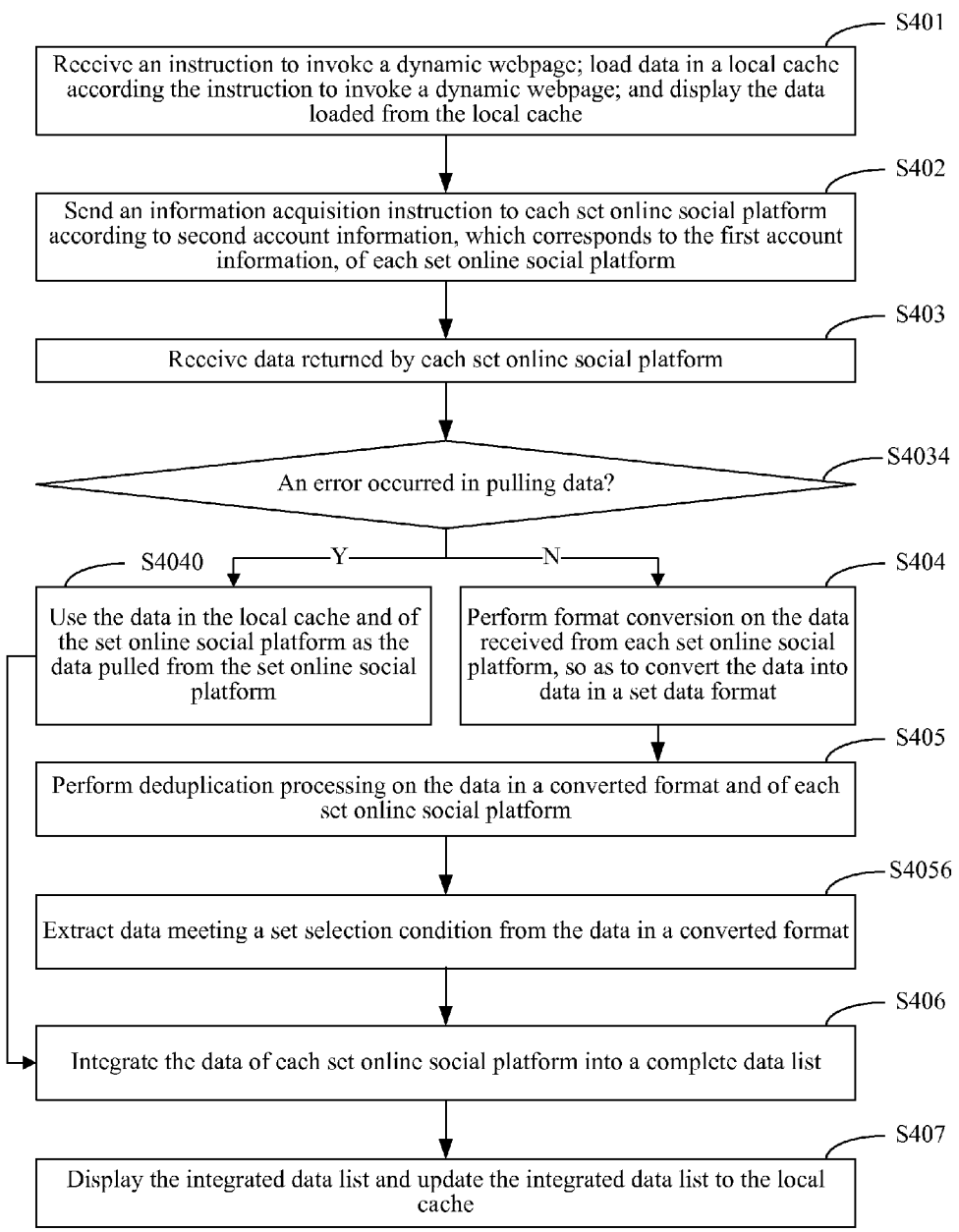
FIG. 4 is a schematic flowchart of Embodiment 4 of a method for dynamically presenting webpage information according to the present disclosure.

FIG. 4 shows a schematic flowchart of Embodiment 4 of a method for dynamically presenting webpage information according to the present disclosure. A difference between this embodiment and the foregoing Embodiment 2 mainly lies in that the method in this embodiment further includes: updating integrated data to a local cache, and loading and displaying, on such a basis, the data in the local cache when an instruction to invoke a dynamic webpage is received.

As shown in FIG. 4, the webpage information presentation method in Embodiment 4 includes:

Step S401: Receive an instruction to invoke a dynamic webpage, where the webpage invoke instruction includes first account information; load data in the local cache according to the webpage invoke instruction; and display the data loaded from the local cache.

Step S402: Send an information acquisition instruction to each designated online social platform according to second account information, which corresponds to the first account information, of each designated online social platform, where the information acquisition instruction includes the foregoing second account information.

Step S403: Receive data returned by each designated online social platform.

Step S404: Perform format conversion on the data received from each designated online social platform, so as to convert the data into data in a designated data format.

Step S405: Perform deduplication processing on the data in a converted format and of each designated online social platform.

Step S406: Integrate the data, obtained after the deduplication processing, of each designated online social platform into a complete data list.

Step S407: Display the integrated data list and update the integrated data list to the local cache.

According to the solution of this embodiment, after the integrated data list is obtained, the integrated data list is further updated to the local cache, so that it is convenient to display the data list next time when webpage information is viewed. Moreover, during viewing of webpage information, data in the local cache is first loaded for display. This reduces a waiting process of receiving returned data when data is pulled from an online social platform.

In the schematic flowchart shown in FIG. 4, a description is made by using an example in which after the webpage invoke instruction is received, the data in the local cache is first loaded for display, and then the data is pulled from each designated online social platform. Actually, a process in which data in a local cache is loaded for display and a process in which data is pulled from each designated online social platform may not be limited to a sequence shown in FIG. 4, and no sequence may be set for the two processes, or the two processes may be performed simultaneously, and no further details are provided herein again.

In the solution of this embodiment, after the data is pulled from each designated online social platform, processing on abnormal pulling may further be performed.

As shown in FIG. 4, between step S403 and step S404, the method in this embodiment may further include:

Step S4034: Determine whether an error occurs in receiving data from the designated online social platform, and if no error occurs, directly perform a processing process in step S404, or if an error occurs, perform step S4040.

Step S4040: Use the data in the local cache and of the designated online social platform as the data received from the designated online social platform. Because the data in the local cache actually is data obtained after format conversion and deduplication processing, after step S4040, an integration processing process in step S406 may be directly performed.

During viewing of data of each online social network product, in a general situation, it may be that only some information in which a user is interested is viewed, and there is no need to view all data of an online social network product. Therefore, only data meeting a condition may be integrated, and then displayed. According to this, between step S405 and step S406, the method may further include:

Step S4056: Extract data meeting a pre-determined selection criterion from the data in a converted format.

In this case, the data for integration in step S406 is data selected in step S4056.

The set selection condition may be set differently according to different actual application needs and different considerations. A specific selection manner may be the same as that of the foregoing Embodiment 2, and no further details are provided herein again.

The following describes a specific processing process in a specific example in detail by using the webpage information presentation method in Embodiment 4 as an example.

When needing to view webpage information of a friend, a user opens a friend web feed page, that is, sends an instruction to invoke a dynamic webpage.

After the webpage invoke instruction is received, data in a local cache is loaded according to the webpage invoke instruction, and the data loaded from the local cache is displayed, so as to avoid a bad effect caused by too much time spent in pulling data from an online social platform. Moreover, an information acquisition instruction is sent to each designated online social platform, and a data pulling logical process is enabled to pull data from each designated online social platform. A process of pulling data from each designated online social platform may be performed in synchronization with displaying of the data in the local cache, and may be in a multithreaded processing manner. The process of pulling data from each designated online social platform does not need to be synchronous, and may be performed in an asynchronous manner, that is, an information acquisition instruction is sent to each designated online social platform and data returned by each designated online social platform is received in an asynchronous manner.

Data may be pulled from each designated online social platform based on an existing manner such as RSS feeds, for example, an information acquisition instruction is sent to a server of an online social platform to obtain required data, and the information acquisition instruction may include the foregoing second account information, and may further include information such as a time deadline and an information type.

After the data from each designated online social platform is received, format conversion is separately performed on the data of each designated online social platform and the data is converted into data in a designated data format to unify different formats of data of the designated online social platforms. During format conversion, followed data content may be extracted from the data first, and then, the data content is converted and encapsulated into data content in a designated data format. A specific processing process is not described herein again.

After format conversion is performed on the data pulled from the designated online social platform, whether an error occurs in receiving data from the designated online social platform is determined, such as, uncompleted pulling or failed pulling, and if an error occurs, the data in the local cache and of the designated online social platform is used as the data received from the online social platform, and a subsequent processing process is performed. Because the data in the local cache actually is data obtained after format conversion and deduplication processing, a subsequent integration processing process may be directly performed.

Subsequently, deduplication processing is performed on the data pulled from each designated online social platform, so as to remove data synchronized from a designated online social platform or another designated online social platform, thereby avoiding duplicated presentation. When the deduplication processing is performed, all data synchronized from another designated online social platform is generally marked with source information thereof. Using Tencent products, namely the zone and the microblog, as an example, and information synchronized from the zone to the microblog has a mark indicating that the information is from the zone. According to this, deduplication processing may be performed according to a source of the data. For example, when a source mark of data of a designated online social platform indicates that the data comes from another designated online social platform, the data can be deleted and duplicated data can be removed. Certainly, if a source online social platform of the data is not in the designated online social platform, that is, data in the source online social platform is not selected for a webpage information presentation; the data may not be deleted.

After the deduplication processing, data that is obtained after deduplication processing and is received from each designated online social platform is integrated into a complete data list.

After the integrated data list is obtained, related page presentation processing may further be performed on the data list, so that data satisfying a page display format can be provided. The page presentation processing herein may be different based on specific setting of a page format, such as, special character escape, expression escape character processing, and picture processing.

After the page presentation processing, data obtained after page presentation processing may be updated to a local cache, output and displayed, and used to replace previously-displayed data in the local cache.

Before the data is written into the local cache, whether space of the local cache is sufficient may be detected first. If the space of the local cache is sufficient, the foregoing data may directly be marked with a time stamp and then written into the local cache. If the space of the local cache is insufficient, old cached data with the earliest time stamp in the local cache may be first deleted, and then, the foregoing data is marked with a time stamp and then is written into the cache.

According to the webpage information presentation method of the present disclosure, the present disclosure further provides a webpage information presentation system. The following describes embodiments of multi-platform presentation systems of the present disclosure in detail.

Embodiment 1—Structural Diagram

Figure 5:
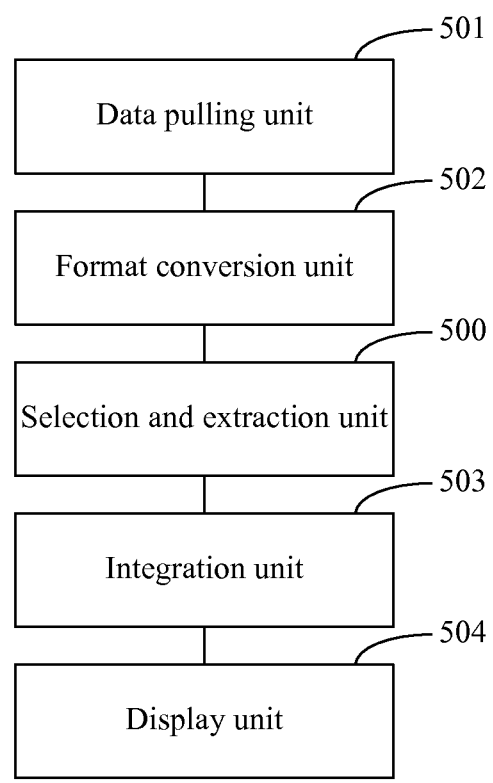
FIG. 5 is a schematic structural diagram of Embodiment 1 of a webpage information presentation system according to the present disclosure.

FIG. 5 shows a schematic structural diagram of Embodiment 1 of a webpage information presentation system according to the present disclosure. As shown in FIG. 5, the webpage information presentation system in Embodiment 1 includes the following.

An data pulling unit 501, configured to receive an instruction to invoke a dynamic webpage, where the webpage invoke instruction includes first account information; send an information acquisition instruction to each designated online social platform according to second account information, which corresponds to the first account information, of each designated online social platform; and receive data returned by each designated online social platform, where the information acquisition instruction includes the second account information.

A format conversion unit 502, configured to perform format conversion on the data received from each designated online social platform to convert the data into data in a designated data format.

An integration unit 503, configured to integrate the data in a converted format and of each designated online social platform into a complete data list.

A display unit 504, configured to display the integrated data list.

According to the solution of this embodiment, when a webpage needs to be opened, the data pulling unit 501 pulls data from each designated online social platform according to an instruction to invoke a dynamic webpage, the format conversion unit 502 performs format conversion on the data pulled from each designated online social platform, to convert the data of each designated online social platform into data in a uniform format, and then, after the integration unit 503 integrates the data into a uniform data list, the display unit 504 displays the data list. Therefore, when webpage information of multiple online social platforms needs to be viewed, it is unnecessary to separately log in to multiple account numbers for viewing. After data is pulled from each online social platform, the data may be converted into data in a uniform format, and then, the data is integrated and viewed, which is convenient and fast, and enables data sharing among different types of online social network products.

When the foregoing data pulling unit 501 pulls data from each designated online social platform, that is, sends an information acquisition instruction to each designated online social platform and receives returned data, an asynchronous manner may be used for pulling.

During viewing of data of each online social network product, in a general situation, it may be that only some information in which a user is interested is viewed, and there is no need to view all data of an online social network product. Therefore, only data meeting a condition may be integrated, and then displayed. According to this, the webpage information presentation system in this embodiment may further include the following.

A selection and extraction unit 500, configured to extract data meeting a pre-determined selection criterion from the data in a converted format.

In this case, the data for integration by the integration unit 503 is data selected and extracted by the selection and extraction unit 500.

The set selection condition may be set differently according to different actual application needs and different considerations.

In one embodiment, it may be that only a first preset number of pieces of latest data are provided for the user to view latest webpage information. The data meeting a pre-determined selection criterion includes the first preset number of pieces of latest data may be presented. The first preset number may be set according to an actual need, for example, may be set to five, ten, twenty, or the like.

In another manner, it may be that data within a recent time period is provided for a user to view webpage information in a recent time period. The data meeting a pre-determined selection criterion includes data in a preset time period may be presented. The preset time period may be set according to an actual need, for example, may be set to ten days, half a month, one month, three months, six months, or the like, and setting may be different according to different needs.

In another manner, considering that the online social platform may provide multiple different types of webpage information, but a user may only need to follow one type of webpage information. For example, webpage information of a zone web feed of a Tencent product may include various different types of information such as status, and a picture. It may be that data of one set information type is provided, that is, data meeting a pre-determined selection criterion includes data of a set information type, where the information type may be set differently according to differences in specific online social platforms and differences in specific actual needs.

In the foregoing descriptions, descriptions are made by using an example in which the set selection conditions respectively are a first preset number of pieces of latest data, data within a recent time period, and data of a set information type. According to an actual need, another selection condition may also be set, or these selection conditions may be combined in any combination manner for selection, such as, a first preset number of pieces of data of a set information type within a recent time period, and examples are not enumerated herein again.

Embodiment 2—Structural Diagram

Figure 6:
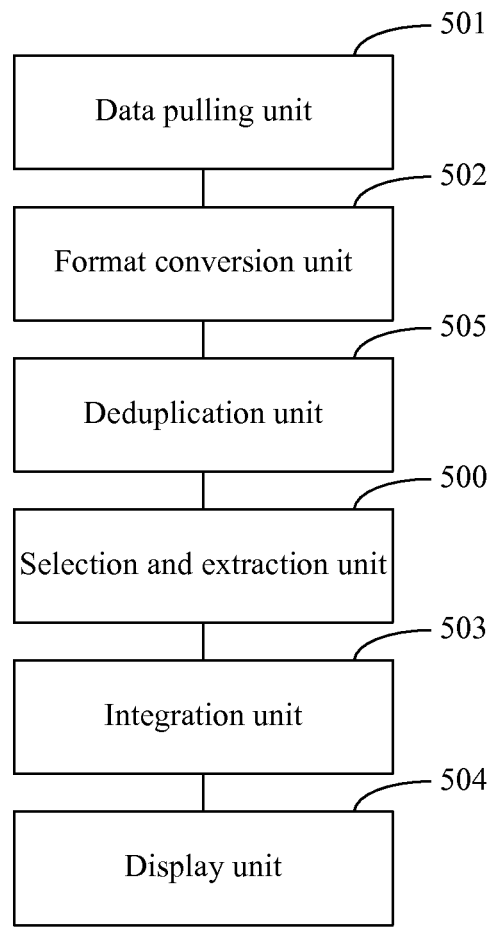
FIG. 6 is a schematic structural diagram of Embodiment 2 of a webpage information presentation system according to the present disclosure.

FIG. 6 is a schematic structural diagram of Embodiment 2 of a webpage information presentation system according to the present disclosure. A difference between this embodiment and the foregoing Embodiment 1 mainly lies in that the system in this embodiment further includes a deduplication unit 505.

As shown in FIG. 6, with respect to the system in Embodiment 1, the webpage information presentation system in Embodiment 2 further includes the following.

The deduplication unit 505, configured to perform deduplication processing on the data in a converted format according to data source information of the data in a converted format and of each designated online social platform.

In this case, the foregoing selection and extraction unit 500 selects data meeting a pre-determined selection criterion from the data obtained after the deduplication processing.

Based on the solution of this embodiment, considering that one or some pieces of webpage information in an online social platform may be synchronized to another online social platform, in this embodiment, deduplication processing is performed to avoid duplicated presentation of same webpage information.

Embodiment 3—Structural Diagram

Figure 7:
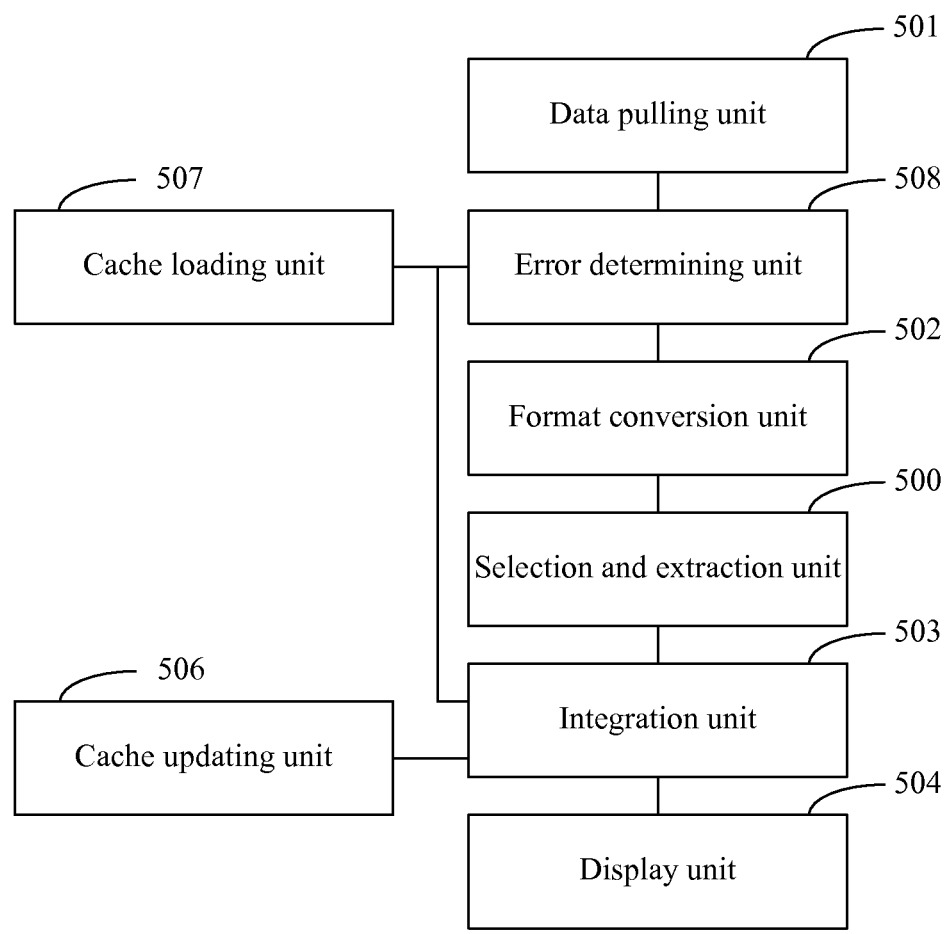
FIG. 7 is a schematic structural diagram of Embodiment 3 of a webpage information presentation system according to the present disclosure.

FIG. 7 is a schematic structural diagram of Embodiment 3 of a webpage information presentation system according to the present disclosure. A difference between this embodiment and the foregoing Embodiment 1 mainly lies in that the system in this embodiment further includes a cache updating unit 506, and on such a basis, may further include a cache loading unit 507.

As shown in FIG. 7, with respect to the system in Embodiment 1, the webpage information presentation system in Embodiment 3 further includes the following.

The cache updating unit 506, configured to update the integrated data list to a local cache.

On such a basis, the system may further include the cache loading unit 507, configured to acquire and load the data list in the local cache after the webpage invoke instruction is received.

According to the solution of this embodiment, after the integrated data list is obtained, the integrated data list is further updated to the local cache, so that it is convenient to display the data list next time when webpage information is viewed. Moreover, during viewing of webpage information, data in the local cache is first loaded for display. The system may display data and reduce a pulling waiting process when data is pulled from an online social platform.

A process in which data in a local cache is loaded for display and a process in which data is pulled from each designated online social platform may be performed simultaneously may have no sequence, or may be performed simultaneously, and no further details are provided herein again.

In the solution of this embodiment, after the data is pulled from each designated online social platform, processing on abnormal pulling may further be performed.

As shown in FIG. 7, the system in this embodiment may further include an error determining unit 508, configured to determine whether an error occurs in receiving, by the data pulling unit 501, data from the designated online social platform.

When the error determining unit 508 determines that no error occurs in receiving, by the data pulling unit 501, data from the designated online social platform, the data received by the data pulling unit 501 from the designated online social platform may be directly sent to a format conversion unit 502 for a subsequent processing process.

When the error determining unit 508 determines that an error occurs in receiving, by the data pulling unit 501, data from the designated online social platform, such as failed pulling or uncompleted pulling, in this case, the data in the local cache and of the designated online social platform may be used as the data received from the designated online social platform. Because the data in the local cache actually is data obtained after format conversion and deduplication processing, the data is directly sent to an integration unit 503 for integration processing.

Embodiment 4—Structural Diagram

Figure 8:
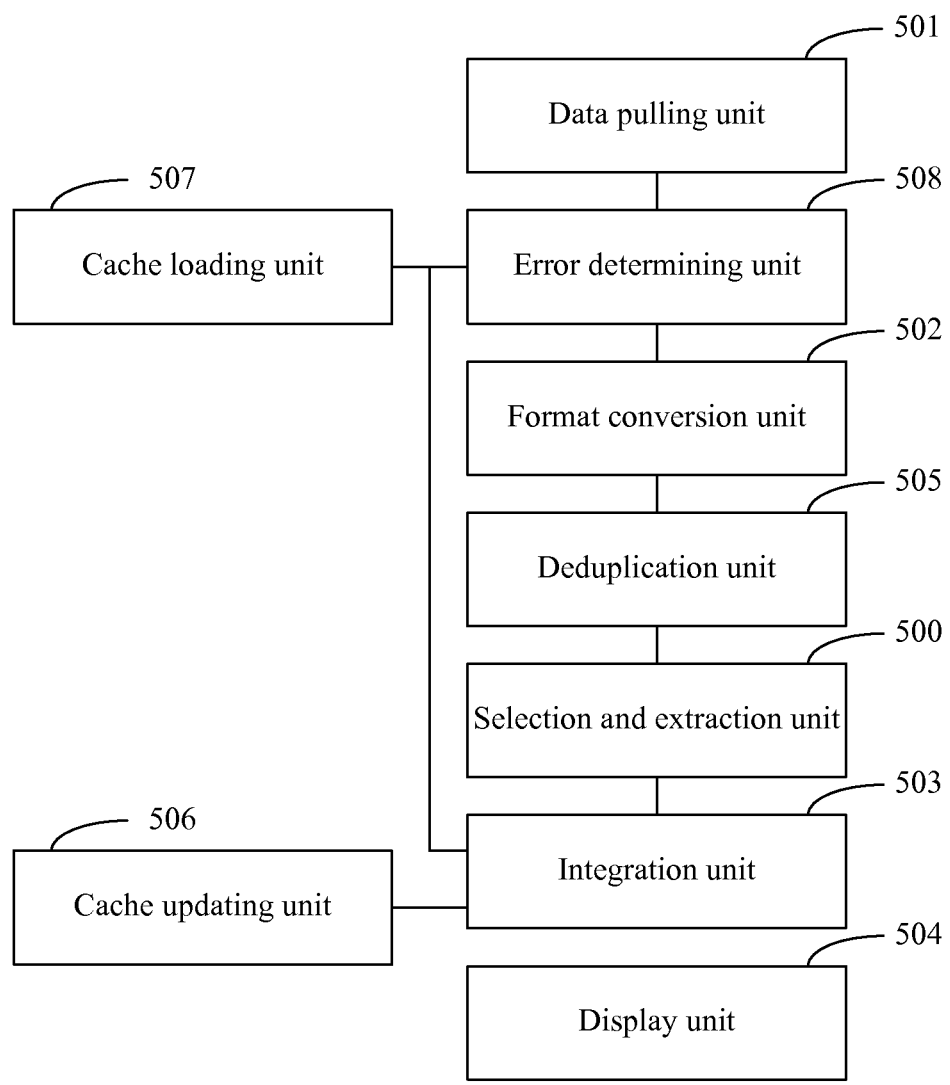
FIG. 8 is a schematic structural diagram of Embodiment 4 of a webpage information presentation system according to the present disclosure.

FIG. 8 is a schematic structural diagram of Embodiment 4 of a webpage information presentation system according to the present disclosure. A difference between this embodiment and the foregoing Embodiment 3 mainly lies in that the system in this embodiment further includes a deduplication unit 505.

As shown in FIG. 8, with respect to the system in Embodiment 3, the webpage information presentation system in Embodiment 4 further includes the following steps.

The deduplication unit 505, configured to perform deduplication processing on the data in a converted format according to data source information of the data in a converted format and of each designated online social platform.

In this case, the foregoing selection and extraction unit 500 selects data meeting a pre-determined selection criterion from the data obtained after the deduplication processing.

FIG. 9 is another schematic diagram of a webpage information presentation system 2000 consistent with the present disclosure. As shown in FIG. 9, the webpage information presentation system 2000 may include a processor 2001, such as a CPU, a network connection 2004, a user interface 2003, storage medium 2005, and a bus 2002. Processor 2001 may include any appropriate processor or processors. Further, processor 2001 can include multiple cores for multi-thread or parallel processing. Storage medium 2005 may include memory modules, such as Read-only Memory (ROM), Random Access Memory (RAM), flash memory modules, and erasable and rewritable memory, and mass storages, such as CD-ROM, U-disk, and hard disk, etc. Storage medium 2005 may store computer programs for implementing various processes, when executed by processor 2001, including the operating system, communication program modules, and other application modules used to implement the system for presenting webpage information consistent with the present disclosure. The network connection 2004 may connect to any appropriate type of communication networks, including the Internet, LAN (Local Area Network), or other types of computer networks or telecommunication networks, either wired or wireless. For example, the network connection 1004 may connect the online webpage information presentation system to the payment platform, so that a user may complete transactions seamlessly.

In FIG. 14, the network connection 2004 may be used to connect the webpage information presentation system 2000 and the user terminal 1000. The network connection 2004 may transfer data between the webpage information presentation system 2000 and the user terminal 1000. The user interface 2003 may be used to allow user to enter input, through a display or a keyboard. The webpage information presentation system 2000 may obtain user input data through user interface 2003. In addition, the processor 2001 may execute the application programs stored in the storage medium 2005 to implement online shopping functions.

In one embodiment, the processor 2001 may execute the following steps before receiving purchase order information from the user terminal. The webpage information presentation system 2000 may receive user log-in information or user account information from the user terminal. The user registration information includes a contact person's name, telephone number, address, etc. In one embodiment, the processor 2001 may execute the following steps and manage the online information presentation process.

Consistent with embodiments of the present disclosure, one or more non-transitory storage medium storing a computer program are provided to implement the system and method for presenting webpage information online. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be semiconductor storage medium, such as DRAM, SRAM, EPROM, EEPROM, flash memory, or memory stick.

Based on the solution of this embodiment, considering that one or some pieces of webpage information in an online social platform may be synchronized to another online social platform, in this embodiment, deduplication processing is performed to avoid duplicated presentation of same webpage information.

Specific processing processes of embodiments of the webpage information presentation systems of the present disclosure may be the same as those of embodiments of the webpage information presentation methods of the present disclosure, and no further details are provided herein again.

The foregoing embodiments only describe several implementation manners of the present disclosure, and the description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure shall be subject to the appended claims.

What is claimed is:

1. A method for dynamically presenting webpage information, comprising:
   receiving, by a user terminal, a webpage invoke instruction to invoke a webpage, the webpage invoke instruction comprising a first account information;
   loading, by the user terminal, data in a local cache of the user terminal according to the webpage invoke instruction to invoke the webpage;
   displaying the data in the local cache on the user terminal;
   sending, by the user terminal, an information acquisition instruction to a designated online social platform according to a second account information, the second account information of the designated online social platform corresponding to the first account information, the information acquisition instruction including the second account information;

receiving, by the user terminal, data returned by the designated online social platform;

determining, by the user terminal, whether an error occurred in receiving data from the designated online social platform;

when no error occurred:
- converting a format of the received data into data in a designated data format;
- integrating the data in the converted designated data format into an integrated data list; and
- displaying the integrated data list on the user terminal;

when the error occurred:
- using the data previously loaded in the local cache of the user terminal as the data received from the designated online social platform;
- integrating the data into the integrated data list without converting a format of the data previously loaded in the local cache of the user terminal; and
- displaying the integrated data list on the user terminal.

2. The method for dynamically presenting webpage information according to claim 1, when no error occurred further comprising: extracting data meeting a selection criterion from the converted data.

3. The method for dynamically presenting webpage information according to claim 2, when no error occurred wherein the data meeting a pre-determined selection criterion comprises any one or any combination of the following: a first preset pieces of latest data; data within a preset time period; and data of a preset information type.

4. The method for dynamically presenting webpage information according to claim 1, when no error occurred further comprising: de-duplicating the data in the converted format according to data source information and the designated online social platform to avoid duplicated presentation of same webpage information.

5. The method for dynamically presenting webpage information according to claim 4, when no error occurred further comprising: extracting data meeting a pre-determined selection criterion from the data obtained after the de-duplicating step.

6. The method for dynamically presenting webpage information according to claim 5, when no error occurred further comprising: loading the data list in the local cache.

7. The method for dynamically presenting webpage information according to claim 1, when no error occurred or error occurred further comprising: updating the integrated data list; and loading the updated data list in the local cache.

8. The method for dynamically presenting webpage information according to claim 1, when no error occurred or error occurred wherein: the information acquisition instruction is sent to each designated online social platform and the data returned by each designated online social platform is received in an asynchronous manner; and the integrated data list is processed and displayed.

9. The method for dynamically presenting webpage information according to claim 1, when no error occurred or error occurred, wherein the data in the local cache is a data previously obtained and converted in the designated data format.

10. A webpage information presentation system, comprising:
- a memory; and
- a processor coupled to the memory;
- wherein the processor is configured to:
  - receive a webpage invoke instruction to invoke a webpage, the webpage invoke instruction including a first account information;
  - load data in a local cache of the user terminal according to the webpage invoke instruction to invoke the webpage;
  - displaying the data in the local cache on the user terminal;
  - send an information acquisition instruction to each designated online social platform according to a second account information, the second account information of each designated online social platform corresponding to the first account information, the information acquisition instruction including the second account information;
  - receive data returned by each designated online social platform;
  - determine whether an error occurred in receiving data from the designated online social platform, wherein,
  - when no error occurred,
  - convert the data received from each designated online social platform into a designated data format;
  - integrate the converted designated data of each designated online social platform into the integrated data list; and
  - display the integrated data list on a user terminal;
  - when the error occurred, the
  - use the data previously loaded in the local cache of the user terminal as the data received from the designated online social platform;
  - integrate the data into the integrated data list without converting a format of the data previously loaded in the local cache of the user terminal; and
  - display the integrated data list on the user terminal.

11. The webpage information presentation system according to claim 10, the processor is further configured to when no error occurred, extract data meeting a pre-determined selection criterion from the converted data.

12. The webpage information presentation system according to claim 11, when no error occurred, wherein the set selection criterion comprises any one of the following or any combination of the following: a first preset pieces of latest data; data within a recent preset time period; and data of a preset information type.

13. The webpage information presentation system according to claim 10, the processor is further configured to when no error occurred, de-duplicate the converted data of each designated online social platform according to data source information of the converted data and of each designated online social platform to avoid duplicated presentation of same webpage information.

14. The webpage information presentation system according to claim 13, the processor is further configured to when no error occurred, extract data meeting a pre-determined selection criterion from the data after the deduplication process.

15. The webpage information presentation system according to claim 10, the processor is further configured to when no error occurred or error occurred, update the integrated data list.

16. The webpage information presentation system according to claim 15, the processor is further configured to when no error occurred or error occurred, load the data list into the local cache after receiving the webpage invoke instruction.

17. The webpage information presentation system according to claim 10, when no error occurred or error occurred, wherein: the information acquisition instruction is sent to each designated online social platform and the data from each designated online social platform is received in an asynchronous manner; and the integrated data list is processed and displayed.

18. A non-transitory computer readable storage medium storing a computer executable instruction, when executed by a processor, the computer executable instruction performing a method for dynamically presenting webpage information, the webpage information presentation method comprising:
receiving, by a user terminal, a webpage invoke instruction to invoke a webpage, the webpage invoke instruction comprising a first account information;
loading, by the user terminal, data in a local cache of the user terminal according to the instruction to invoke the webpage;
displaying the data in the local cache on the user terminal;
sending, by the user terminal, an information acquisition instruction to each designated online social platform according to a second account information, the second account information of each designated online social platform corresponding to the first account information, the information acquisition instruction including the second account information;
receiving, by the user terminal, data returned by each designated online social platform and converting the data into a designated data format;
determining, by the user terminal, whether an error occurred in receiving data from the designated online social platform;
when no error occurred:
converting a format of the received data into data in a designated data format; and
integrating the converted designated data of each designated online social platform into an integrated data list and displaying the integrated data list on the user terminal;
when the error occurred:
using the data previously loaded in the local cache of the user terminal as the data received from the designated online social platform;
integrating the data into the integrated data list without converting a format of the data previously loaded in the local cache of the user terminal; and
displaying the integrated data list on the user terminal.

\* \* \* \* \*